United States Patent [19]
Anderson

[11] Patent Number: 5,791,844
[45] Date of Patent: Aug. 11, 1998

[54] PORTABLE WINCH CRANK FOR FLATBED TRAILERS

[76] Inventor: Robert D. Anderson, 1239 Williams Rd., Piketon, Ohio 45661

[21] Appl. No.: 735,518

[22] Filed: Jan. 22, 1997

[51] Int. Cl.$^6$ .................................................. B60P 7/08
[52] U.S. Cl. ........................ 410/103; 410/100; 410/101
[58] Field of Search ........................... 410/12, 100, 103, 410/97, 101, 106; 254/213, 266, 323; 24/68 CD, 265 CD; 248/499

[56] References Cited

U.S. PATENT DOCUMENTS

| | | | |
|---|---|---|---|
| 2,991,975 | 7/1961 | Alexander | 410/103 |
| 3,240,473 | 3/1966 | Coffey et al. | 410/103 |
| 3,428,331 | 2/1969 | Morgan et al. | 410/100 |
| 3,697,045 | 10/1972 | Farley | 410/103 |
| 4,273,484 | 6/1981 | Blanar | 410/12 |
| 4,428,099 | 1/1984 | Richmond | 24/68 CD |
| 4,884,928 | 12/1989 | Nachtigall et al. | 410/103 |

*Primary Examiner*—Stephen Gordon
*Attorney, Agent, or Firm*—G. M. Graham

[57] ABSTRACT

An improved winch crank assembly for use on typical flatbed trailers whereon cargo is secured using flexible straps is described. The present invention permits the rapid winding of the straps onto the winch and reduces the time required for winding the straps by tenfold or more. The present winch crank assembly comprises a portable crank assembly wherein a single crank can be used to wind the straps onto a plurality of winches on a single trailer. In addition, the portability allows the user to conveniently carry the crank for use on other truck trailers.

3 Claims, 4 Drawing Sheets

PORTABLE WINCH CRANK FOR FLATBED TRAILERS

BACKGROUND OF THE INVENTION

This invention relates to flatbed trailers used for the transport of cargo wherein the cargo is secured to the trailer using flexible cords or straps. In one aspect it relates to a winch crank assembly for rapidly rewinding the straps onto the winch when the straps are not in use. In a specific aspect it relates to a portable winch crank assembly wherein a single crank may be used to rewind the straps on a plurality of winches on a single trailer or on different trailers.

Commercial cargo is frequently transported using tractor trailer rigs wherein the trailer is an open flatbed trailer. Numerous types of cargo are transported in this way including timber, lumber, metal stock, and machinery, to name but a few. The cargo is often secured to the trailer by long flexible straps which are placed over or around the cargo transverse the bed length and secured to both sides of the trailer. Woven nylon and/or canvas-type straps are widely used due to their strength, flexibility, and weather resistance. The straps are usually wound on the take-up drum of a winch which is located on one side of trailer. For securing the cargo a sufficient length of the strap is withdrawn from the winch, laid over the cargo, and connected to the opposite side of the trailer using a hook which is fixed to the end of the strap. Once the strap is so disposed, the slack in the strap is taken up by turning the winch until the tension in the strap is sufficient to hold the cargo in place.

A problem in the above approach is encountered after the cargo has been removed and the securing strap needs to be rewound onto the winch for storage. For larger, cargo there may be a significant length of strap which needs to be rewound with from twenty to thirty feet not being uncommon. Additionally, for longer cargo, such as lumber, a plurality of individual straps and winches are spaced along the length of the trailer with as many as a dozen or more often employed. In this configuration each strap is rewound individually on its respective winch. In the past this has been done by manually turning the drum of the winch by gripping the drum and turning it in angular increments of about one half turn. By this procedure it is virtually impossible to continuously turn the take-up drum for rewinding the strap. This procedure is complicated by the fact that the winches are usually mounted under the bed of the trailer with very little clearance between the drum and the underside of the bed. Most importantly, for long straps and multiple winches this is a very time consuming process which may require anywhere from two to three minutes per strap depending on the user. Therefore, for rewinding the straps on a dozen winches, the total time required may be up to thirty minutes or more. In addition, the repeated gripping and regripping of the drum as it is turned to rewind the strap causes excessive wear of work gloves which over time can be a significant expense to replace.

U.S. Pat. No. 4,884,928 discloses a winch having a crank for rotating the winch for tightening and loosening the strap of a winch used to secure cargo on a flatbed trailer. A problem associated with winches having a crank which is integral with the winch is that for trailers having a plurality of winches, each winch must be fitted with a crank. Also, drivers of tractor trailers and the like often change trailers in the course of delivering cargo. Thus the driver may at some time be using a trailer which is fitted with winches having crank means and at other times using a trailer with winches without crank means. The use of the portable crank of the present invention is designed to solve these problems.

SUMMARY OF THE INVENTION

The present invention provides a novel crank assembly for rapidly turning winches on flatbed trailers for rewinding the securing straps. The portable crank assembly comprises a rotatable handle that is sized to permit rapid and continuous rotation of the winch for rewinding the straps. The use of the present invention reduces the time required to wind the straps by tenfold or more. A single portable crank assembly may be used to rewind the straps on a plurality of winches on single flatbed trailer. Alternatively, a single portable crank may be conveniently carried by the user for use on different trailers.

As explained in detail below, the present winch crank assembly is designed for use with winches which have a strap take-up or dispensing drum which is integral with a protruding hub that has a hollow cylindrical core. These types of winches are presently in widespread use in the trucking industry. The crank assembly comprises a handle having at one end a rotatable grip and at the other end a expandable compression member which may be inserted into the hollow core of the hub. Tightening means are provided whereby a compressive force may be selectively applied to the compression member whereby the member is expanded into compressive engagement with the inner walls of the hub. The frictional force induced between the compression member and the hub permit the continuous rotation of the crank and hub as a unit for rapidly rewinding the securing straps. After rewinding the strap, the tightening means may be loosened whereby the compression member resumes its original shape and thereby disengages from the winch hub. The crank assembly may then be withdrawn and used on a different winch.

The utility of the present invention can be appreciated when considering that there are presently thousands of flatbed trailers with winches that have a structure compatible for use with the portable crank assembly of the present invention. The savings in man-hours spent rewinding the securing straps is potentially enormous.

DESCRIPTION OF THE PREFERRED EMBODIMENTS

Figure 1:
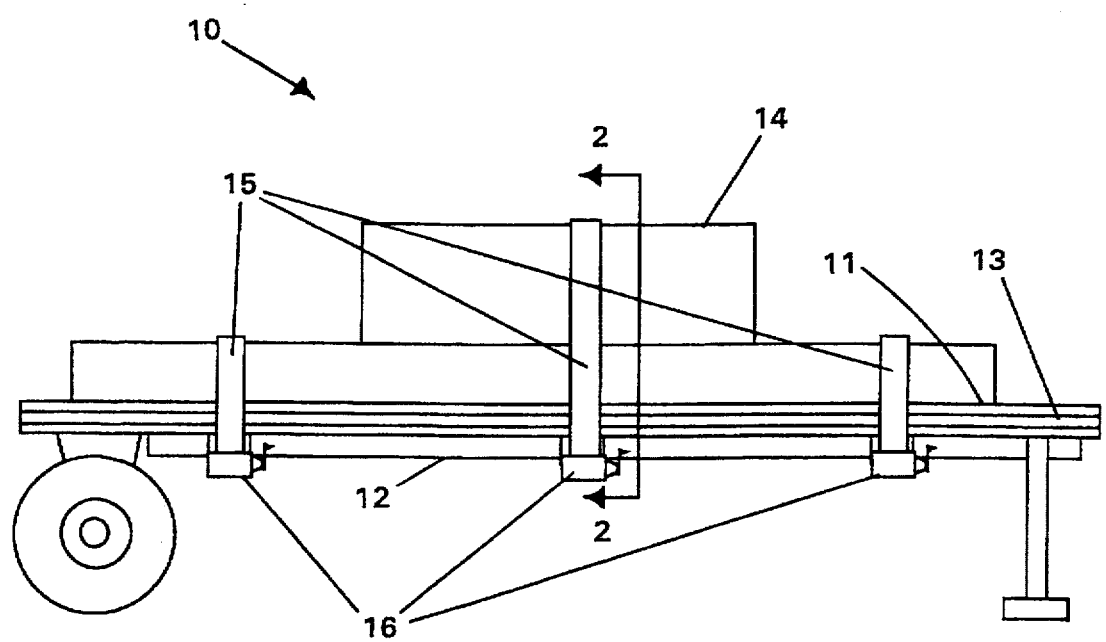
FIG. 1 is a side view of a flatbed trailer equipped with a plurality of winches whereon the present crank assembly may be adapted.
Figure 2:
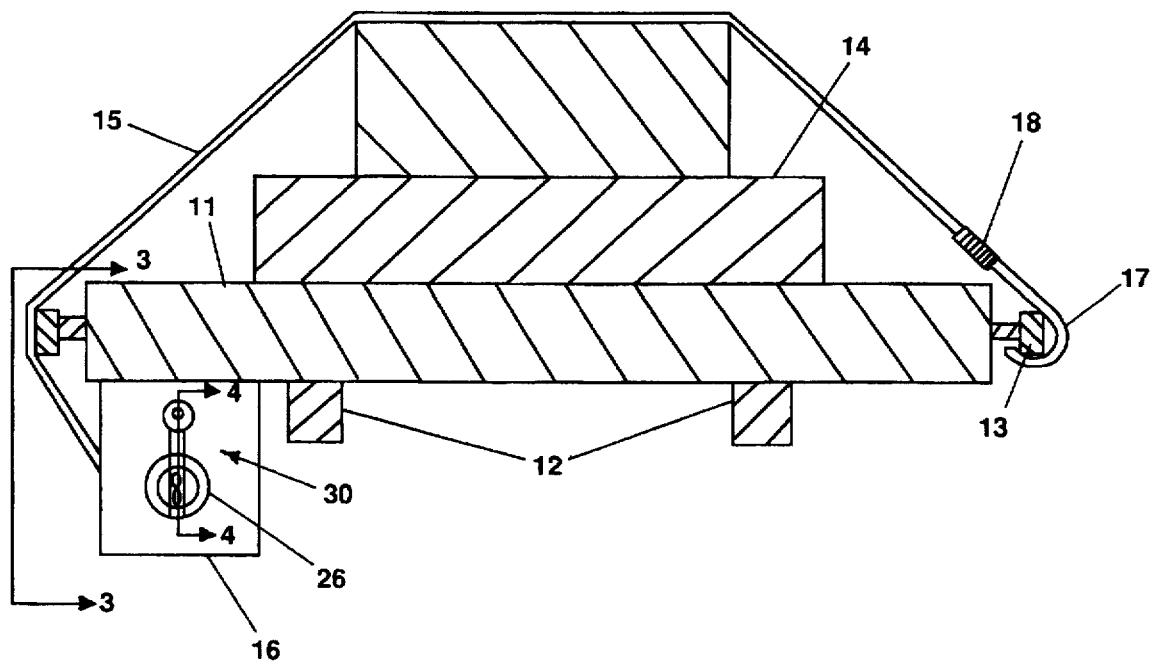
FIG. 2 is a sectional view of the flatbed trailer taken along line 2—2 of FIG. 1.

FIGS. 1 and 2 illustrate a typical flatbed trailer 10 consisting of bed 11 secured to frame 12 and having railings 13. Cargo 14 is secured on bed 11 for transport by a plurality of flexible straps 15 spaced along the length of the bed. Straps 15 extend transverse the bed length and have a loose end which is rolled onto the take-up drum of winches 16, and at the opposite end the straps are fixed to hook 17 which hooks around railing 13 to secure the strap to the truck bed. Straps 15 may be made of woven nylon fibers or canvas-type materials and hook 17 may be attached by stitching as at 18. Although three straps and winches are shown in FIG. 1, this is by way of illustration only and any number of straps and winches may be employed with up to a dozen or more often employed. The elements of trailer 10 are also by way of illustration and variations are possible without departing from the spirit of the invention.

Figure 3:
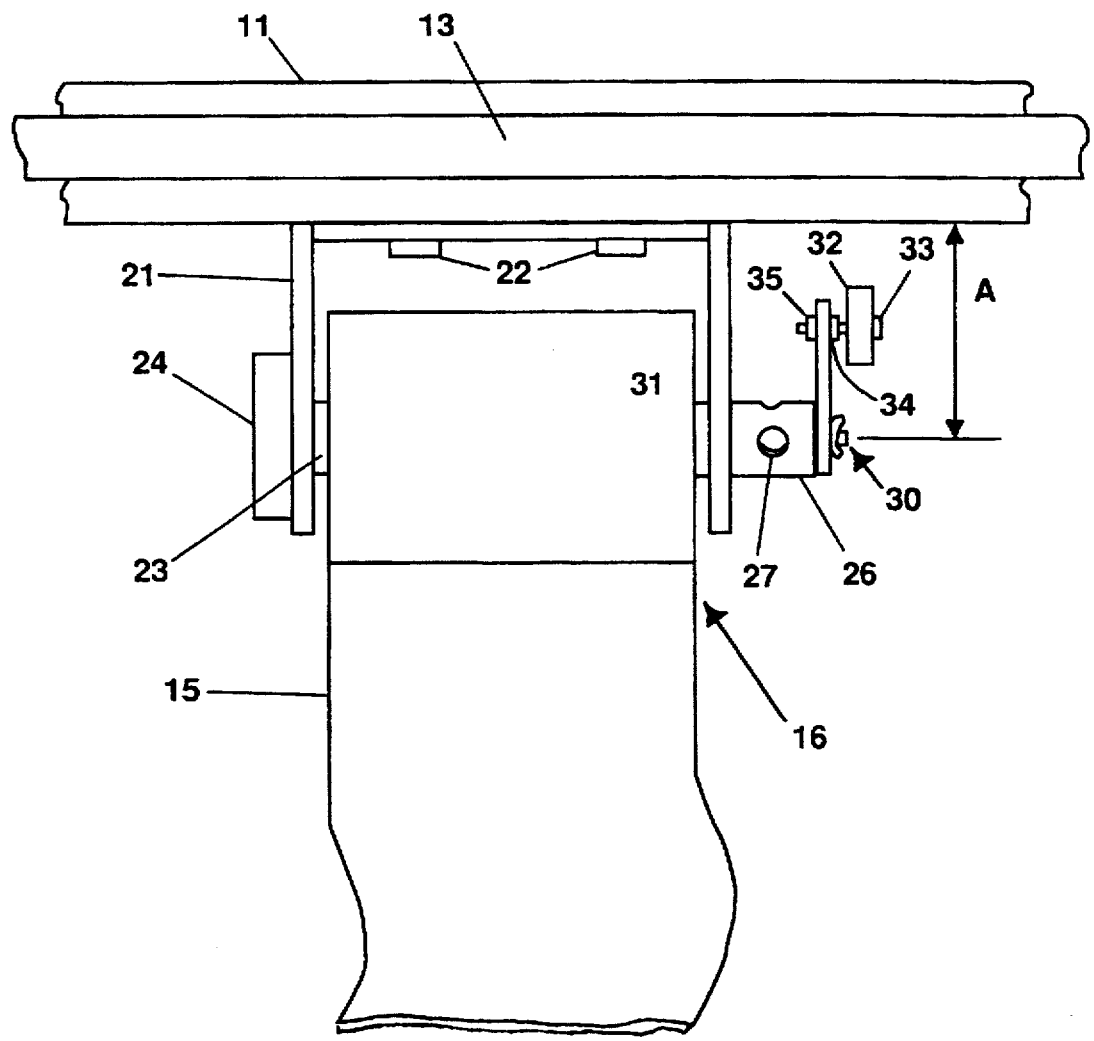
FIG. 3 is a frontal view of a winch equipped with the crank of the present invention shown substantially along line 3—3 of FIG. 2.

As best seen in FIG. 3, winch assembly 16 comprises frame 21 fixed to the underside of bed 11 using bolts 22, or other means such as welding. Alternatively winch 16 may be fixed to a portion of a frame 12. In either case the winch is mounted to one side of the trailer directly underneath bed 11. Drum 23 is rotatably disposed in frame 21 and serves as a dispensing roll for winding strap 15 thereon. Winch 16 further comprises ratchet mechanism 24 which may be manually engaged or disengaged with drum 23 by a lever (not shown). With ratchet 24 engaged, drum 23 may turn in the take-up direction only (i.e. the direction which winds strap 15 onto drum 23). With ratchet 24 disengaged, drum 23 may turn in either direction for winding or dispensing strap 15. Winch 16 further comprises protruding exposed hub 26 which is secured to or integral with drum 23 so that the hub rotates with the drum. Hub 26 has a hollow core 29 and has holes 27 formed therethrough for receiving a lever bar which is used to tension strap 15 with ratchet 24 engaged.

Winch 16 is usually mounted under bed 11 for safety purposes as well as for protecting the winch. While the dimensions may vary from trailer to trailer the clearance distance (labeled "A" in FIG. 3) between the underside of the bed and the longitudinal axis of the drum is typically between 3 to 8 inches. With strap 15 completely rolled onto drum 23 of the winch, the radius of the roll measured from the drum longitudinal axis is greater than about one half the clearance distance "A" depending on the total length of the strap. Thus with strap 15 completely rolled onto drum 23 the clearance between the top of the rolled strap and the bottom of bed 11 is generally less than 1 to 2 inches. The dimension "A" should be as small as possible for safety purposes and to protect the winch from damage, but "A" must be large enough to permit strap 15 to be completely rolled onto drum 23 without the strap contacting the underside of bed 11.

Figure 4:
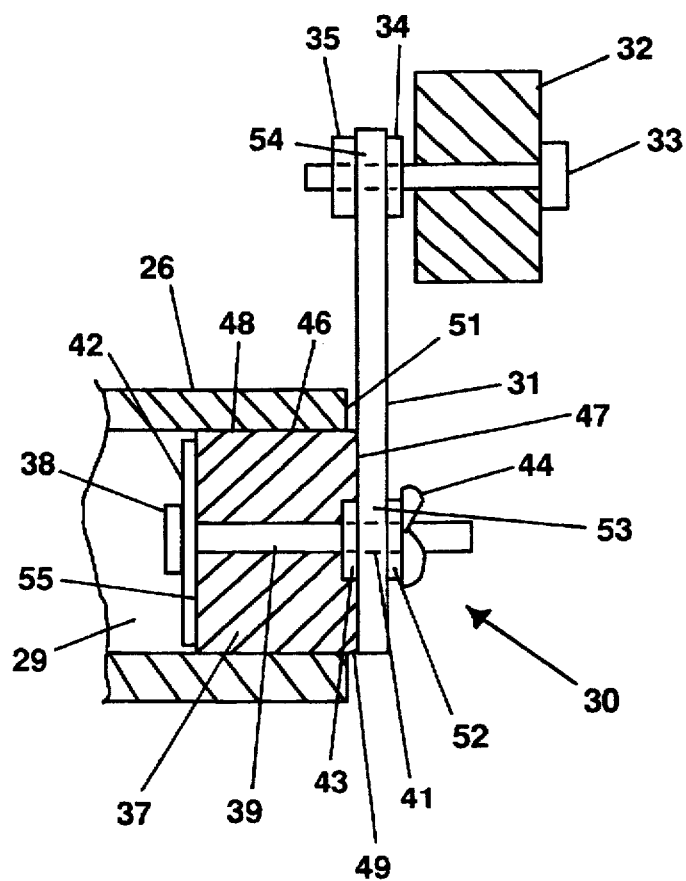
FIG. 4 is a sectional view of the present crank assembly taken along line 4—4 of FIG. 2.

Referring to FIGS. 3 and 4, winch assembly 16 is provided with crank assembly 30 which is secured to hub 26 at one end as described below. Crank assembly 30 comprises bar member 31 extending substantially perpendicular to the longitudinal axis of drum 23. Bar 31 has inner end 53 and outer end 54 having secured thereto rotatable wheel-type grip element 32 secured to the bar by bolt 33. Bar 31 may be cut from flat metal bar stock and grip 32 may be cut from round bar stock of hard plastic or metal material. The use of plastics is preferred to reduce corrosion which would hinder the rotation of the grip on bolt 33. As illustrated in FIG. 3, bolt 33 passes through grip 32 and through bar 31. Nut 34 is threaded onto the bolt before inserting the bolt through the bar. Nuts 34 and 35 are counter-tightened onto opposite sides of bar 31 securing the bar thereto. The length of bolt 33 is sized to leave grip 32 rotatably disposed on the bolt in the space between nut 34 and the head of the bolt after nuts 34 and 35 have been tightened. The use of bolt 33 is preferred over pins or rivets because grip 32 may be easily removed and replaced if damaged.

As best seen in FIG. 4, crank assembly 30 further comprises cylindrical flexible compression member 37 which is fixed to bar 31 by bolt or pin 38. Member 37 is preferably constructed from a resilient, semi-hard, rubber-like material which is deformable under stress and will return to its original shape when the stress is removed. Pin 38 extends outwardly through hole 39 in member 37 and passes through hole 41 of bar 31. Backup washer 42 acts as a compression plate and is disposed on the inside of compression member radial surface 55, and smaller washer 43 is disposed on the opposite side. Wing nut 44 is threaded onto bolt 38 for securing the compression member to bar 31. Lock washer 52 is provided between bar 31 and nut 44. In the undeformed, or radially relaxed, position the outer diameter of member 37 is sized to permit the member to be slidingly inserted into hollow core 29 of hub 26 thereby presenting exposed surface 47. After inserting the compression member wing nut 44 is tightened by hand which acts to draw washer 42 towards bar inner end 53 thereby creating a compressive stress in member 37. The compressive force causes the outer surface 48 of flexible member 37 to swell outward into a radially compressed position that forces the member against the inner walls of hub 26 as at wall 46. The compressive force creates sufficient friction between member 31 and wall 46 for hub 26 and assembly 30 to become locked together and thereby rotated as a unit without slippage by rotating bar 31 via grip 32. In addition to the compressive force between member 37 and wall 46, the expansion of member 37 causes the member to swell around small washer 43 and exposed surface 47 of the member thereby contacts the inner end of bar 31. Washer 43 is sized to permit a large contact area between member 37 and bar 31 whereby a significant friction force is established therebetween. The friction force eliminates any slippage between bar 31 and member 37 as the crank is turned for rewinding straps 15 onto drum 23. Member 37 generally does not contact bar 31 in the unstressed position. FIG. 4 illustrates member 37 as protruding slightly from hub 26 as at 49. It is equally effective for the member to be inserted entirely into the hub whereby the end of the hub will contact bar 31 as at 51.

For removing crank assembly 30 for use on other winches, wing nut 44 is loosened by hand and washer 42 moves away from bar 31 thereby relieving the stress on member 37. Resilient compression member 37 returns to its original shape and size whereby it may be slidably withdrawn from hub 26. The overall length of crank 30 is not critical, however, it is preferably 1 to 2 inches shorter than dimension "A" to permit a continuous 360 degree rotation of the crank. The overall length of bar 31 is preferably between 2 to 6 inches so that the crank assembly may be conveniently carried by the user from winch to winch or from trailer to trailer. In this way it is not necessary for each winch and/or trailer to be fitted with a crank mechanism for deriving the rapid-wind advantage provided by the crank. The use of the present crank 30 reduces the time required to wind strap 15 onto drum 23 by tenfold over winches with no crank. In the latter case the most widely practiced method is to simply grip hub 26 and turn the hub by hand in small angular increments.

Other means for selectively moving washer 42 to and away from bar 31 for applying and relieving the compressive stress in member 37, respectively, are possible without departing from the spirit of the present invention.

What is claimed:

1. A truck bed assembly capable of anchoring cargo thereon, comprising:
   (a) a flat bed
   (b) a plurality of straps extending transversely over and across the bed at longitudinal intervals, each strap having an end secured to one side of the flat bed and a loose distal end,
   (c) a plurality of winch assemblies mounted under the flat bed and on the bed side opposite the side on which the straps are secured, each winch assembly comprising
      (i) a strap take-up drum for receiving a respective said distal strap end, (ii) a hub having a hollow interior secured to the drum and extending axially outwardly therefrom thereby presenting an exposed hollow end, (iii) a resilient member mounted in the exposed hollow end of the hub thereby presenting an exposed surface, the resilient member being sized to permit movement of the resilient member relative to the hub from a position with the resilient member in a radially relaxed position to a position with the resilient member in a radially compressed position, (iv) a bar extending radially outwardly from the hub and having an inner end positioned opposite the exposed end of the hub and an outer end with a rotating grip mounted thereon, the length of the bar being sufficiently short to permit free rotation relative to the bed, (v) a pin extending axially through the resilient member and the inner end of the bar, (vi) a washer mounted on the pin and being in contact with a radial surface of the resilient member, (vii) means for securing the inner end of the bar to the exposed surface of the resilient member, and (viii) means for selectively moving the resilient member between the radially relaxed position whereby the bar and resilient member may be removed from the hub, and the radially compressed position whereby the bar, the resilient member, and the hub are locked together as a unit whereby turning of the bar turns the hub and takes-up the strap on the drum.

2. The bed assembly of claim 1 further comprising means for selectively moving the washer mounted on the pin towards the inner end of the bar whereby the resilient member is placed in the radially compressed position, and away from the inner end of the bar whereby the resilient member is placed in the radially relaxed position.

3. The bed assembly of claim 1 wherein the distance between the longitudinal axis of each winch assembly and the underside of the flat bed is between 3 to 8 inches and the length of the bar is between 2 and 6 inches.

* * * * *